Patented May 7, 1929.

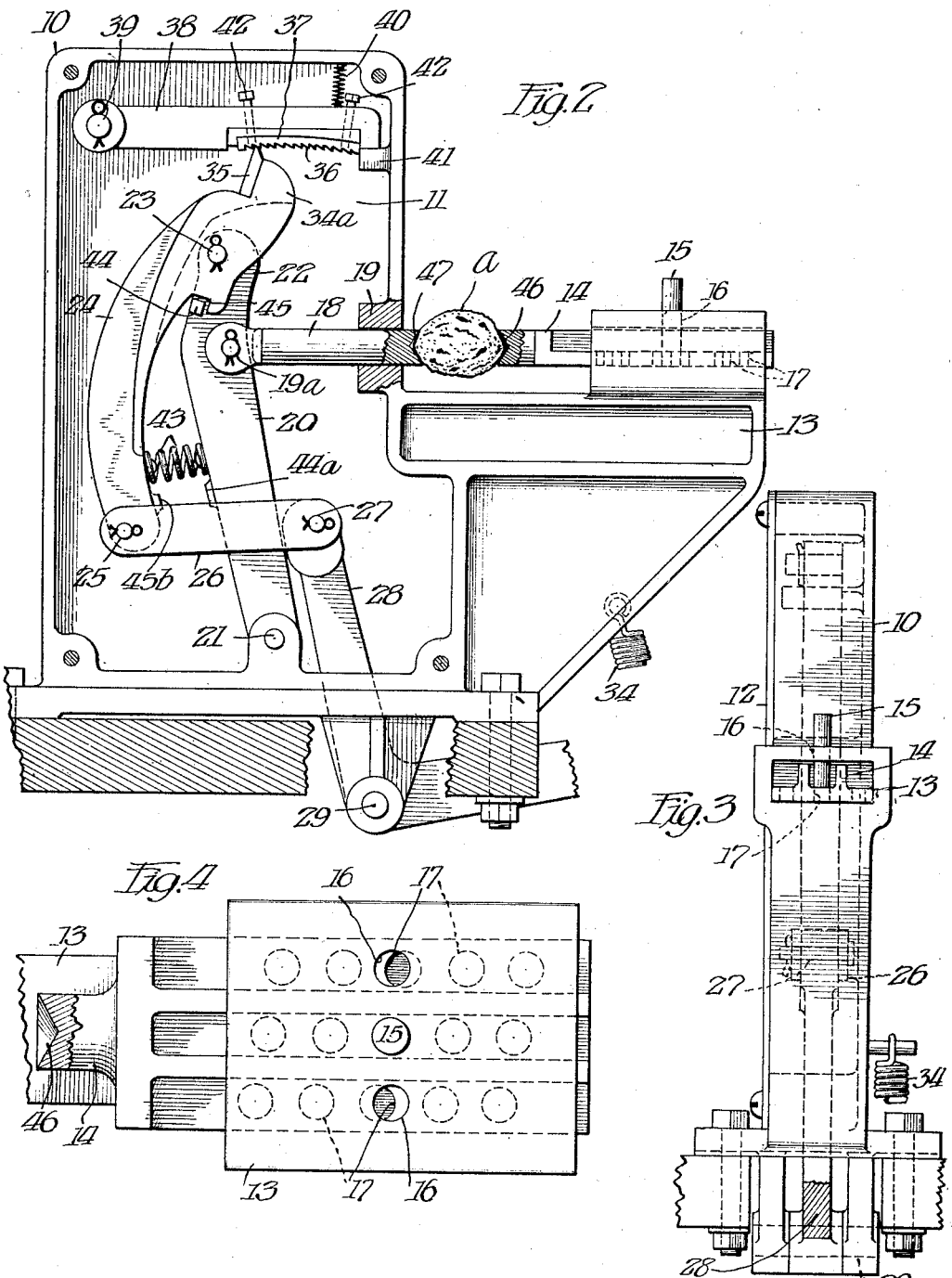

1,712,105

UNITED STATES PATENT OFFICE.

CHARLES E. DELLENBARGER, OF CHICAGO, ILLINOIS, ASSIGNOR TO PAUL CARPENTER, OF GLENVIEW, ILLINOIS.

NUT-CRACKING MACHINE.

Application filed September 23, 1920. Serial No. 412,238.

My present invention relates in general to power applying devices and more particularly to presses, and is specifically directed to devices of such general character applying a controlled amount of pressure.

While my invention is of general utility, for purposes of illustration, it is shown as applied to a nut cracking machine for performing the functions of which it is peculiarly adapted.

Among the functions desirable in a nut cracking machine are the availability of the machine for cracking nuts of varying diameters and the performance of the cracking operation in such a manner as to avoid fracturing the kernel meats of the nuts.

The principal objects of the present invention, therefore, are the provision of a nut cracking machine employing means for accommodating varying sizes of nuts; a machine of the character referred to wherein each nut regardless of its size, is subject only to force sufficient to crack the shell without at the same time crushing or even fracturing the meat; the provision in a power applying machine of means for applying a controlled amount of pressure to the object acted upon; the provision generally of improved pressure element positioning means, and particularly of means for first positioning and then operating said pressure element; the provision of improved means for proportioning the force applied to size of the object acted upon; the provision of improved means for advancing the pressure element into contact with the object to be acted upon; the provision of improved means for applying force to the object to be acted upon after the pressure element is brought into position to exert force upon the object; the provision of improved means for exerting force in which the power utilized for bringing the force exerting means into position for operation is no factor in the amount of power applied; the provision of an improved force exerting mechanism which is free from any hammer-like blow upon the object to be acted upon; the provision in a nut-cracking machine of cooperating means for first advancing the nut-cracking element into contact with the nut to be cracked and then exerting the force necessary to crack the nut; the provision of a system of levers for the functions referred to arranged in primary advancement as a group and secondary advancement of an element thereof as a pressure member, and finally actuation of certain members as a toggle construction; the provision in a mechanism of the character referred to of a variable fulcrum for a lever, adapted to accommodate itself to the size of the object acted upon; the provision of an improved means for variably supporting an anvil; together with such further and additional objects as may hereinafter appear.

In attaining the objects referred to, together with certain benefits and advantages to be below pointed out, I have provided a construction one embodiment whereof is illustrated in the accompanying drawings, wherein—

Figure 2 is a view similar to that of Figure 1 illustrative of the relations assumed by the parts in a similar position with reference to a larger object;

Figure 3 is a fragmentary end elevation, viewing the machine of Figures 1 and 2 from the right-hand aspect thereof; and Figure 4 is a plan view of the details of construction of a form of anvil employed by me.

Figure 1:
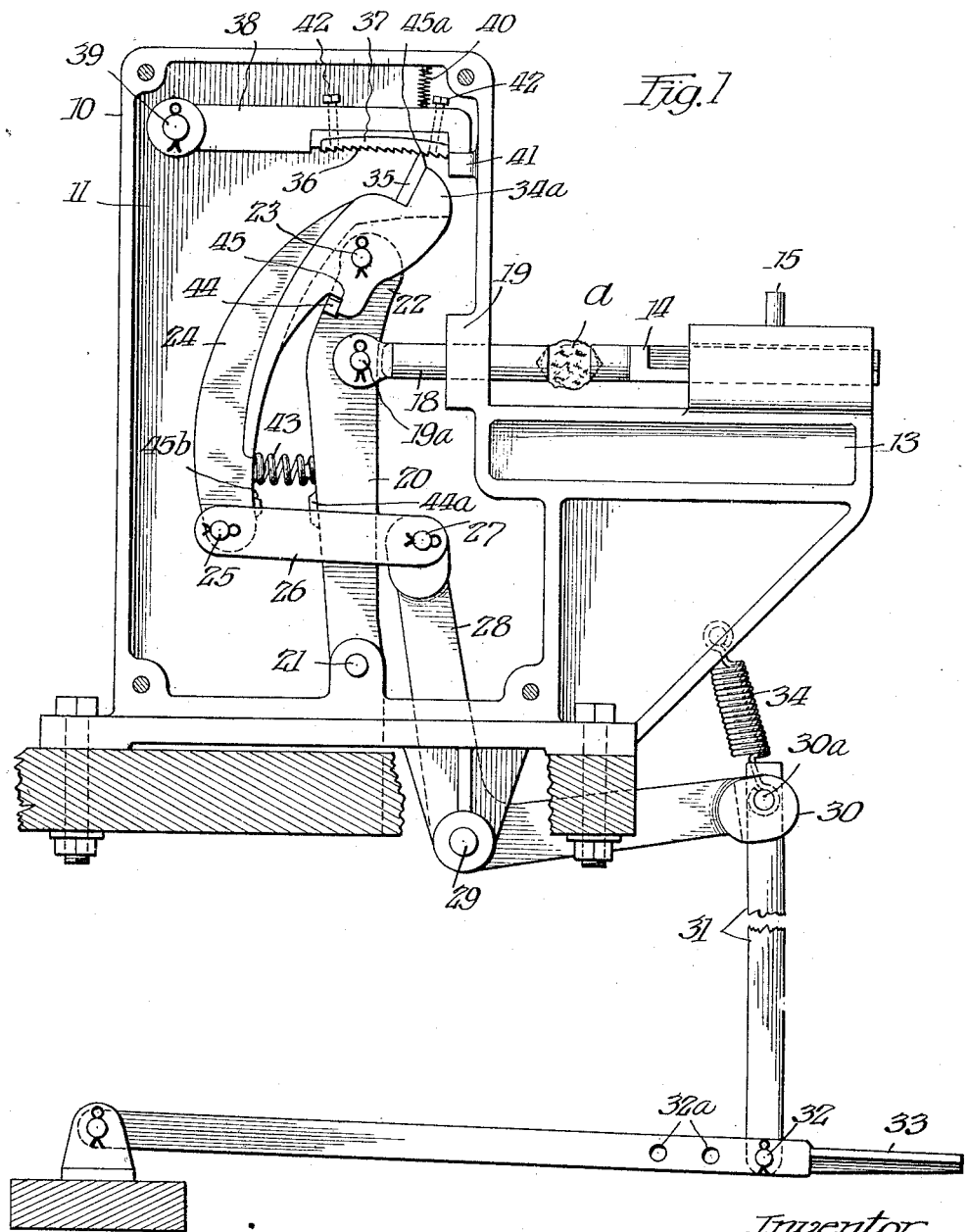
Figure 1 is an elevational view of a machine embodying my present invention illustrative of the parts in position for the application of pressure to an object to be acted upon.

In carrying out my invention as will be observed on reference to Figures 1 and 2 of the drawings, I find it convenient to employ a frame indicated generally at 10, having a compartment indicated generally at 11, closed by a cover 12, (see Figure 3).

Exteriorly of the compartment 11, I arrange on a base 13, an anvil or fixed abutment 14, which is conveniently slidably mounted on the base 13, and fixed thereto by means of a pin 15, entering one of the holes 16 (see Figure 4), and one of the several series of holes 17 in the anvil 14, the series holes 16 and 17 being adapted successively to register, whereby the anvil 14 may be closely positioned at a predetermined point.

It will be observed that the series of holes 16 lie in one plane, whereas the several series of holes 17 lie in planes at an angle thereto.

Again reverting to Figure 1, it will be perceived that power is applied to the object A rested against the anvil by means of a reciprocating plunger 18 guided in its reciprocation by a boss 19 formed on the side of the housing 10.

At its inner end the plunger 18 is pivoted, as indicated at 19ª, to a lever 20 in turn pivoted at its lower end 21 to the casing 10.

The upper end 22 of the lever 20 pivotally carries, as indicated at 23, a lever 24 in turn pivoted at its lower end as indicated at 25 to one end of a floating link 26 pivoted at the opposite end 27 to the end of one arm 28 of a bell-crank.

This bell-crank is pivoted at 29 to the casing 10 and the opposite end 30 of the bell-crank is pivoted on the pin 30ª to the upper end of a connecting rod 31 in turn pivoted at its lower end, as indicated at 32, to a treadle 33.

In order to sustain the treadle in lifted and operative position, and the several levers in their normal "inoperative" position, a coiled spring, 34, is attached at one end to the framing 10 and at the other end to the pivot pin 30ª.

Extending upwardly from the pivot, 23, I arrange on the lever, 24, a part, 34ª, preferably provided with a replaceable hardened insert, 35, serving as a detent to engage with the teeth, 36, on a quadrant, 37, carried by the support, 38, pivoted at one end, 39 on the casing 10, the opposite end being pressed downward by the spring, 40, against the limit, 41, on the casing 10.

The quadrant, 37, is supported from the frame member, 38, for angular and bodily variation relatively thereto by means of screws, 42, 42 socketed in the quadrant 37 and threaded into the support 38.

For reasons to be hereinafter brought forward, a compression spring, 43 is interposed between the lower portion of the lever, 24, and the lever, 20, and the lever, 20, is provided with a limiting stop, 44, engaging in a notch, 45, in the lever, 24.

In the operation of the mechanism above described, a nut A is implaced against the anvil, 14, and the treadle, 33, is depressed. This will swing the bell-crank about the pivot, 29, shifting the floating lever, 26, to the right and with it, as a unit, the composite lever construction, including the lever 24, and by virtue of the connection, 23, and spring, 43, the lever, 20, thus advances the plunger, 18, against the nut A.

In the movement just described, the detent, 35, adjacent to the ratchet 37, moves through an arc of a circle having its center at the pivot, 21, for which reason the member, 37, is given the curvature corresponding to the movement of said detent.

As soon as the plunger, 18, comes into contact with the nut A and consequently meets with resistance to its movement, the traverse of the upper end, 34ª, of the lever, 24, discontinues, and the continued movement to the right of the floating link, 26, (due to the continued depression of the treadle 33) causes the lever, 24, to swing about the point of engagement between the detent, 35, and the toothed portion, 36, of the member, 37, which now becomes the fulcrum point for the entire pressure applying mechanism. This causes compression of the spring, 43, until the detent, 35, comes into contact with the rack, 36, at the point 45ª, which causes the lever 20, again to move about the pivot, 21, and exert pressure upon the nut A, thus momentarily holding the plunger stationary and so avoiding any possibility of a shock contact due to momentum.

After a slight further movement of the plunger, 18, in cracking the shell of the nut, with concomitant swinging of the pivot point, 23, about the pivot point, 21, the stop, 45ᵇ, contacts with the stop 44ª, and the compression action is ended, and the several parts resume their normal "inoperative" position upon the return of the bell-crank, 28.

This cracking of the shell of the nut is materially assisted by the contours of the face, 46, of the anvil, 14, and the co-acting end, 47, of the plunger, 18, (see Figures 4 and 2 respectively.)

For cracking thin-shelled nuts, such as pecans, without injury to the meat, substantial portions of the ends of the oblong nut A will seat in such faces, 46 and 47, so that when pressure is applied, the tendency will be to shorten the nut by causing the shell thereof to bulge at its sides until the cracking point is reached.

It will be observed that the movement of the treadle occupies two stages, the first being one wherein the plunger is advanced into contact with the nut, and the second being one wherein the movement of the treadle applies pressure to the nut for cracking the shell.

The change from one stage to the other will be accomplished, as will be readily discovered, without hammer-like blow or shock, but will be readily noticed by the operator of the machine who can control the treadle accordingly.

In the case of nuts having relatively thick shells, such as filberts, the plunger, 18, may be provided with a cutting edge for splitting the shell, as indicated in Figure 1.

To provide for adjustment of the throw of the treadle, 33, and thereby of the movement of the several parts operated thereby, the connecting rod, 31, is detachably attached thereto by means of the removable pin, 32, which engages not only the member, 31, but may be inserted in any one of the holes 32ª.

Having thus described my invention and illustrated its use, what I claim as new and desire to secure by Letters Patent is—

1. In a device of the character described, in combination, an anvil, a pressure member movable toward the anvil to apply pressure to an object positioned between it and the anvil, and means for positively moving said pressure member toward the anvil to cause it to contact with and non-yieldingly grasp the object between the anvil and said pressure member, said moving means being adapted for further movement into pressing contact with such object.

2. In a device of the character described, in combination, an anvil, a pressure member movable toward the anvil to apply pressure to an object positioned between it and the anvil, and means operating through a continuous stroke for positively moving said pressure member toward the anvil to cause it to contact with and non-yieldingly grasp the object between the anvil and said pressure member, said moving means being adapted for further movement into pressing contact with such object.

3. A device of the character described comprising, the combination with an anvil, of a pressure member movable toward the anvil to apply pressure to an object positioned between it and the anvil, and means for causing said pressure member first to approach and positively grasp the object, and then to exert pressure thereupon, said last mentioned means being so constructed and to positively cause a momentary discontinuation of the movement of the pressure member toward the anvil.

4. A device of the character described comprising the combination with an anvil, of a pressure member, and means for moving said pressure member toward the anvil, said means being constructed and arranged to positively cause the pressure member to cease moving momentarily upon meeting any resistance to its movement.

5. A device of the character described comprising the combination with an anvil, of a pressure member, and means for moving said pressure member, including a lever construction, adapted to pivot about one fulcrum in the absence of resistance and about another fulcrum in the presence of resistance.

6. A device of the character described comprising the combination with an anvil, of a pressure member, and means for moving said pressure member, including a lever construction, adapted to pivot about one fulcrum in the absence of resistance and about another fulcrum in the presence of resistance, the last mentioned fulcrum being variable.

7. A device of the character described comprising the combination with an anvil, of a pressure member, and means for moving said pressure member, including a lever construction, adapted to pivot about one fulcrum in the absence of resistance and about another fulcrum in the presence of resistance, the last mentioned fulcrum being variable and becoming ineffective after a certain resistance has been overcome.

8. A device of the character described comprising the combination with an anvil, of a pressure member, and means for moving said pressure member, including a lever construction, adapted to pivot about one fulcrum in the absence of resistance and about another fulcrum in the presence of resistance, the last mentioned fulcrum being variable and becoming ineffective after a certain movement of the pressure member.

9. A device of the character described comprising the combination with an anvil, of a pressure member and means for moving said pressure member towards and away from said anvil acting in four stages, the first stage including bringing the pressure member into contact with the object to be acted upon, the second stage including a discontinuation of movement of the pressure member, the third stage including the application of pressure to the object, and the fourth stage including the discontinuation of the pressing action of the pressure member.

10. A device of the character described comprising the combination with an anvil, of a pressure member and means for advancing the pressure member towards the anvil in such stages as to prevent the application of pressure to an object interposed between the pressure member and the anvil with momentum as a factor of such pressure.

11. A device of the character described comprising the combination with an anvil against which an object may be rested, of a pressure member and means for positively advancing the pressure member towards the anvil automatically in such stages as to prevent any crushing impact upon the object.

12. A device of the character described comprising the combination with an anvil, of a pressure member, and continuously operating means for positively moving the pressure member including a lever construction adapted for one movement in the absence of resistance to the pressure member and for another movement in the presence of resistance thereto, said pressure member automatically coming to a complete stop between such movements.

13. A device of the character described comprising the combination with an anvil, of a pressure member, and continuously operating means for positively moving the pressure member including an actuating member adapted for one movement in the absence of resistance to the pressure member and for another movement in the presence of resistance thereto, said pressure member automatically coming to a complete stop between such movements.

14. A device of the character described comprising the combination with an anvil, of a pressure member, and means for positively moving the pressure member including an actuating member adapted for one movement in the absence of resistance to the pressure member and for another movement in the presence of resistance thereto and a yieldingly resistant device effective as said actuating member passes from one of said movements into the other thereof.

15. A device of the character described comprising the combination with an anvil, of a pressure member and means for moving said pressure member towards said anvil including a pair of levers pivoted together, one of said levers having a fixed fulcrum and the other of said levers having a floating fulcrum, and lever actuating means engaging said last mentioned lever for first moving said two levers about said fixed fulcrum and toward the anvil and then fixing said floating fulcrum and moving said last mentioned lever about said last mentioned fulcrum and into operative contact with said first mentioned lever whereby a further thrust is imparted to said first mentioned lever.

16. A device of the character described comprising the combination with an anvil, of a pressure member and means for moving said pressure member towards said anvil including a pair of levers pivoted together, one of said levers having a fixed fulcrum and the other of said levers having a floating fulcrum, and lever actuating means engaging said last mentioned lever for first moving said two levers about said fixed fulcrum and toward the anvil and then fixing said floating fulcrum and moving said last mentioned lever about said last mentioned fulcrum and into operative contact with said first mentioned lever whereby a further thrust is imparted to said first mentioned lever, a yieldingly resistant element being interposed between said two levers for absorbing shock as the one lever moves into thrusting contact with the other.

17. A device of the character described comprising the combination with an anvil, of a pressure member and means for advancing said pressure member toward the anvil including two levers pivoted together, and means for moving the pivotal connection of said levers about a fixed fulcrum and then causing said pivotal connection to move about another fixed fulcrum.

18. A device of the character described comprising the combination with an anvil, of a pressure member and means for advancing said pressure member, including two levers pivoted together and means for first causing said levers to move together as a unit and then causing the levers to move relatively to each other about their pivotal connection.

19. A device of the character described comprising the combination with an anvil, of a pressure member, and means for advancing the pressure member toward the anvil including a lever and means for bodily moving the lever in one direction and then moving it about a fixed fulcrum.

20. A device of the character described comprising the combination with an anvil, of a pressure member and means for advancing the pressure member toward the anvil including a lever and means for causing said lever to swing first about its fulcrum, then rest momentarily when resistance is met, and then to continue its movement in the original direction.

21. A device of the character described comprising the combination with an anvil, of a pressure member and means for advancing the pressure member toward the anvil comprising a pair of levers pivoted together and means for causing said levers to move about a fixed fulcrum provided for one of the levers and then about a fixed fulcrum provided for the other of said levers.

22. A device of the character described comprising the combination with a pressure member and means for imparting movement to the pressure member, of an anvil and a support therefor, and means for varying the relation of the anvil to the support having means for varying the relation between the anvil and the support including a member engaging both the anvil and the support, one of which is provided with means whereby it may be engaged at a plurality of points displaced both laterally and longitudinally.

23. A device of the character described comprising the combination with a pressure member and means for imparting movement to the pressure member, of an anvil and a support therefor, and means for varying the relation of the anvil to the support having means for varying the relation between the anvil and the support including a pin engaging both the anvil and the support, one of which is provided with holes whereby it may be engaged at a plurality of points displaced both laterally and longitudinally.

24. A device of the character described comprising the combination with a pressure member and means for imparting movement to the pressure member, of an anvil and a support therefor, and means for varying the relation between the anvil and the support including a member for fixing the anvil and the support against relative movement, one of said members being provided with a plurality of series of holes, each series being arranged in a line at an angle to the direction of movement of the anvil, and said fixing member being adapted for engagement with said holes.

25. A device of the character described comprising the combination with a pressure member and means for imparting movement to the pressure member, of an anvil and a support therefor, and means for varying the relation between the anvil and the support including a member for fixing the anvil and the support against relative movement, one of said members being provided with a plurality of series of holes, each series being arranged in a line at an angle to the direction of movement of the anvil, and the other of said members being provided with a series of holes cooperating with said first mentioned holes.

26. A device of the character described comprising the combination with an anvil, of a pressure member and means for moving said pressure member towards said anvil including a lever and a fulcrum for said lever mounted for displacement relatively to said lever.

27. A device of the character described comprising the combination with an anvil, of a pressure member, and means for moving said pressure member towards said anvil including a lever and a fulcrum for said lever adapted for bodily displacement relatively to said lever.

28. A device of the character described comprising the combination with an anvil, of a pressure member, and means for moving said pressure member towards said anvil including a lever and a fulcrum for said lever mounted for movement about a pivot relatively to said lever.

29. A device of the character described comprising the combination with an anvil, of a pressure member and means for moving said pressure member towards said anvil including a lever and a fulcrum member and yieldingly resistant means for pressing said fulcrum member into contact with the lever.

30. A device of the character described comprising the combination with an anvil, of a pressure member and means for moving said pressure member towards said anvil including a lever and a fulcrum member and yieldingly resistant means for pressing said fulcrum member into contact with the lever and a limit stop for said fulcrum member.

31. A device of the character described comprising the combination with an anvil, of a pressure member and means for moving said pressure member towards said anvil including a lever and a ratchet toothed fulcrum member and means for causing said fulcrum member to contact with said lever.

32. A device of the character described comprising the combination with an anvil, of a pressure member and means for moving said pressure member including a lever and a fulcrum, said lever being first moved bodily about a pivot and relatively to said fulcrum, and then about said fulcrum.

33. A device of the character described comprising the combination with an anvil, of a pressure member and means for moving said pressure member towards said anvil including a lever and an extended fulcrum surface, said lever being first moved about a pivot and bodily relatively to said fulcrum surface and then about a point on said fulcrum surface, said fulcrum surface being curved on the arc of a circle about said pivot.

34. A device of the character described comprising the combination with an anvil, of a pressure member and means for moving said pressure member towards said anvil including a lever, an extended fulcrum surface, and means for causing said lever to fulcrum about different points on said fulcrum surface.

35. A device of the character described comprising the combination with an anvil, of a pressure member and means for moving said pressure member towards said anvil including a lever, an extended fulcrum surface, and means for causing said lever to fulcrum about different points on said fulcrum surface, said fulcrum surface being angularly displaceable.

36. A device of the character described comprising the combination with an anvil, of a pressure member and means for moving said pressure member towards said anvil including a lever, an extended fulcrum surface, and means for causing said lever to fulcrum about different points on said fulcrum surface, said fulcrum being bodily displaceable.

37. A device of the character described comprising the combination with an anvil, of a pressure member and means for moving said pressure member towards said anvil including a lever, an extended fulcrum surface, and means for causing said lever to fulcrum about different points on said fulcrum surface, said fulcrum surface being both angularly and bodily displaceable.

38. A device of the character described comprising the combination with an anvil, of a pressure member, means for moving the pressure member from a predetermined starting point toward the anvil, and means for varying such starting position, including a treadle, and means for varying the relation of the treadle to said moving means.

39. A device of the character described comprising, the combination with an anvil, of a pressure member movable toward the anvil to apply pressure to an object positioned between it and the anvil, and means for positively causing said pressure member first to approach and yieldingly contact with the object, and then to exert pressure thereupon, said last mentioned means being so constructed that while moving uninterruptedly will cause a momentary discontinuation of the movement of the pressure member toward the anvil.

40. A device of the character described comprising the combination with an anvil, of a pressure member, and means having a continuous movement for positively moving said pressure member toward the anvil, said means being constructed and arranged to simultaneously cause the pressure member to cease moving momentarily upon meeting any resistance to its movement.

41. In combination, a relative stationary abutment, a pressure member movable toward said abutment, and means adapted for continuous motion and for simultaneously positively imparting an intermittent motion to said pressure member.

42. A device of the character described comprising the combination with an anvil, of a pressure member and continuously moving means for positively advancing the pressure member automatically intermittently toward the anvil, whereby pressure in the absence of shock is exerted upon an object interposed between the pressure member and the anvil.

43. A device of the character described comprising the combination with an anvil, of a pressure member and continuously operating means for automatically advancing the pressure member towards the anvil in such stages as to prevent the application of pressure to an object interposed between the pressure member and the anvil with momentum as a factor of such pressure.

44. A device of the character described comprising the combination with an anvil against which an object may be rested, of a pressure member and means operating continuously in one direction for advancing the pressure member positively towards the anvil in such stages as to first cause said member to contact with such object and stop, and then impose pressure upon the object.

In testimony whereof I have hereunto signed my name.

CHARLES E. DELLENBARGER.